April 24, 1951     P. A. SPORING     2,550,308
ELECTRICAL CONDENSER

Filed June 27, 1945

Inventor
Percy Archibald Sporing by Wilfred E. Lawson
Attorney.

Patented Apr. 24, 1951

2,550,308

UNITED STATES PATENT OFFICE 2,550,308

ELECTRICAL CONDENSER

Percy Archibald Sporing, Hampton Hill, England, assignor to The Telegraph Condenser Company Limited, North Acton, England, a British company Application June 27, 1945, Serial No. 601,827
In Great Britain March 27, 1944

Section 1, Public Law 690, August 8, 1946
Patent expires March 27, 1964

2 Claims. (Cl. 175—41)

The present invention relates to electrical condensers of the stacked type, that is to say, condensers comprising interleaved metal plates having intervening layers of mica or other dielectric, alternate metal plates being connected together to form one pole of the condenser and the remaining plates being connected together to form the other pole. In some cases, however, floating metal plates not connected to either pole are inserted at intervals in the stack. Among the main objects of the invention are to ensure the satisfactory stacking together of the metal and insulating plates constituting the elements of the condenser, to afford the required mechanical protection for the stack, and to provide means whereby any number of condenser units may be readily and rapidly connected together in any desired series or series-parallel arrangement.

According to the invention, the metal plates forming the stack in an electrical condenser, as also the intervening sheets of insulation, are supported directly or indirectly by a conductive stem, the apertures in alternate metal plates being of such a size as to ensure electrical contact with such stem, which thus, together with the metal plates in contact with it, constitutes one pole of the condenser. For the purpose of mechanical protection, the stack may be enclosed within a metal casing which constitutes the other pole of the condenser and with which therefore the remaining alternate metal plates of the stack are in conductive contact. For connecting such condenser units together, means, such as a screw thread, is provided whereby the conductive stem of one unit may be readily engaged with the casing of a succeeding unit, in such a manner as to afford mechanical and electrical connection between such units.

In order that the invention may be clearly understood and readily carried into effect, it will now be described more fully with reference to the accompanying drawing which illustrates, by way of example, one form of condenser in accordance therewith and wherein—

Figure 1:
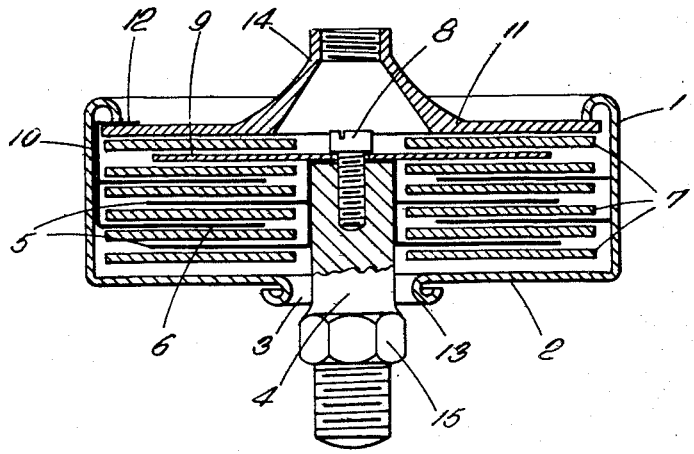
Figure 1 shows the condenser in longitudinal section.

Referring to Figure 1, the protective casing is constituted by a metal cylinder 1 having at one end an internal flange 2 whereby the casing is partially closed. Through the aperture 3 surrounded by the flange 2 there extends a central metal stem 4, the size of the aperture 3, however, being such that the stem 4 does not bear on the internal flange 2. Within the cylinder 1 and threaded over the stem 4 there are placed alternately discs of metal foil 5, 6 and of mica 7, there being a disc of mica both at the top and bottom of the stack as formed.

As regards the discs of metal foil, two series are employed to constitute respectively opposite poles of the stack. In one series 5, the central aperture is initially smaller than the diameter of the stem 4, so that, as these discs are placed over the latter, the internal marginal portions are bent so as to rest on the end of the stem and are clamped thereto by a screw 8 inserted in the stem 4. For this purpose, the last metal disc 9 of the series of discs, that is to say, the disc most remote from the internal flange 2 is made of metal stouter than the foil employed for the remaining discs, so as to form a washer for the head of the screw 8. It should be mentioned that, in order to illustrate the construction clearly, the casing 1 has been shown materially deeper than would normally be the case, so that the deformation of the discs 5 bearing on the central stem 4 is much exaggerated; in normal constructions the total thickness of the stack of mica and metal foil discs is so small that there is only slight deformation of the central area of each of the discs 5 in order that it may bear on the end of the stem 4. The external diameter of each of the metal discs in the series 5 making contact with the central stem is less than the internal diameter of the cylindrical casing 1, so that there is no possibility of electrical contact between these discs and the casing. As regards the intervening mica discs 7, the diameter of the internal aperture in each is such that they may be readily threaded over the central stem 4.

Respecting the other series of metal foil discs 6 which are in electrical connection with the casing 1 and form the second pole of the condenser, the diameter of the central aperture in each of them is larger than that in any of the metal discs 5 of the first series and also than that of the apertures in the mica discs 7. On the other hand, their external diameter is approximately equal to the internal diameter of the casing 1. Thus, when these discs are threaded over the central stem 4 and are placed within the casing, there is no possibility of their coming into contact with the former, while, on the other hand, at their external periphery they make contact with the latter. In order, however, to ensure that this contact shall be complete, each disc is formed with one or more lugs 10 extending approximately at right angles to it, but capable of being bent slightly outwardly so as to bear on the internal cylindrical surface of the casing 1. The casing is closed by a cover 11 of more-or-less disc-like form, placed on the stack at the end remote from the internal flange 2 the side of the casing being bent or spun over the cover 11 in order to hold it into position. For the purpose of more completely ensuring adequate electrical connection between each of the second series of metal discs 6 and the casing 1, the lug or lugs 10 on each disc may be of such length as to be bent or spun over with the edge of the casing and gripped between it and the cover 11, as seen at 12.

In order that an even pressure may be exerted on the stack, it is desirable to grind the inside surface of the cover 11 perfectly flat and also to form the internal flange 2 so that initially it makes an angle with the side of the casing 1 which is slightly less than 90°, that is, it is of conical form. When, subsequently, pressure is applied in spinning the casing over the cover, the flange 2 is flattened out and exerts spring pressure on the stack. As indicated at 13, the edge of the flange 2 is bent over on itself so as to present a radiused edge in order to minimise the possibility of corona discharge between the flange and the stem 4, which, in use, are of opposite polarity.

In addition to the above electrically active metal discs, there may be inserted, in any desired arrangement, floating discs which are unconnected to either pole of the condenser, such discs being, of course, separated from each other and from neighboring electrically active discs by discs of mica. In such floating metal discs, the internal diameter would be substantially equal to that of one of the discs 6, and the external diameter to that of one of the discs 5; thus each floating disc would lie completely in the area of overlap between the discs 5 and 6.

Figure 2:
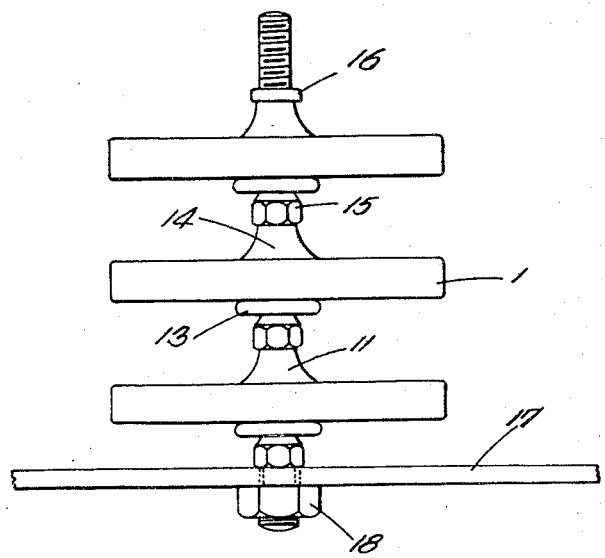
Figure 2 illustrates a number of condensers connected together.

For the purpose of connecting together two of the stacked units such as above described, the cover 11 in each is formed with a boss 14, which is drilled and internally screw-threaded as shown; correspondingly the central stem 4 is extended and is externally screw-threaded for the purpose of engaging the internal screw-thread on the cover of a succeeding unit. Thus, as depicted in Figure 2, any number of units may be connected together in series by simply screwing the central stem of one unit into the cover of the next, flats 15 being formed on the stems 4 to facilitate this operation. To the first and last of such units there might be fitted suitable terminals, such as 16, made to engage respectively the screw threads on the cover and central stem. As indicated in Figure 2, however, the last stem in a series might be fitted into a supporting panel 17 and secured by a nut 18, electrical connection being made through the panel, if of conducting material; if it be of insulating material, however, a soldering tag or its equivalent, secured to the stem by a nut or the like, may be employed. As an alternative method of mounting, the threads on the covers and stems may be engaged by appropriate members forming part of a frame or the like whereby single units, or any number of units connected in series, might be placed in parallel connection, thus providing a readily constructed series-parallel system.

What I claim and desire to secure by Letters Patent of the United States is:

1. An electrical condenser comprising in combination a metal casing, stacked metal plates therein, intervening sheets of insulation between the plates, each sheet having an aperture, alternate metal plates having apertures and being in electrical connection with said metal casing, a conductive stem extending through said apertures in said insulating sheets and said metal plates without touching said metal plates, the remaining alternate plates of said metal plates having a portion overlying an end of and in electrical connection with said stem, a screw threaded into the said end of said stem, and a metal disc surrounding said screw and bearing on the said portions of said last mentioned metal plates located against the said end of the stem.

2. An electrical condenser comprising in combination a metal casing, stacked metal plates therein, intervening sheets of insulation between the plates, each sheet having an aperture, alternate metal plates having apertures, a conductive stem extending through said apertures in said insulating sheets and said metal plates without touching said metal plates, the remaining alternate plates of said metal plates being in electrical connection with said stem, means for mechanically clamping said last mentioned metal plates to one end of said stem, a cover for said casing, the edge of said casing being turned over to bear on said cover and a lug on each of said first mentioned alternate metal plates, said lugs being clamped between said turned over edge and said cover.

PERCY ARCHIBALD SPORING.

REFERENCES CITED

The following references are of record in the file of this patent:

UNITED STATES PATENTS

| Number | Name | Date |
| --- | --- | --- |
| 1,440,142 | Fuegel | Dec. 26, 1922 |
| 1,537,386 | Tingley | May 12, 1925 |
| 1,571,501 | Van Deventer | Feb. 2, 1926 |
| 1,603,640 | Reed | Oct. 19, 1926 |
| 1,754,268 | Dubilier | Apr. 15, 1930 |
| 1,831,092 | Bowles | Nov. 10, 1931 |
| 1,937,010 | Dubilier et al. | Nov. 28, 1933 |
| 1,963,606 | Bailey | June 19, 1934 |
| 1,965,007 | Smith | July 3, 1934 |
| 2,348,693 | Minnium | May 9, 1944 |

FOREIGN PATENTS

| Number | Country | Date |
| --- | --- | --- |
| 247,881 | Great Britain | Feb. 25, 1926 |